Dec. 17, 1935.  E. A. BOYSON  2,024,505

ROTARY SWITCH

Filed Nov. 17, 1934    2 Sheets-Sheet 1

Inventor

Emerson A. Boyson

By *Clarence A. O'Brien*
Attorney

Dec. 17, 1935.  E. A. BOYSON  2,024,505
ROTARY SWITCH
Filed Nov. 17, 1934   2 Sheets-Sheet 2

Inventor
Emerson A. Boyson

By Clarence A. O'Brien
Attorney

Patented Dec. 17, 1935

2,024,505

UNITED STATES PATENT OFFICE 2,024,505

ROTARY SWITCH

Emerson A. Boyson, Rome, N. Y.

Application November 17, 1934, Serial No. 753,534

1 Claim. (Cl. 200—59)

My invention relates generally to electrical switches wherein elements are rotated relative to each other to produce connection and disconnection of electrical circuits, and particularly to an automobile steering column switch wherein the rotation of the steering rod either to the right or to the left is effective to close and open signal lamp circuits for indicating the direction and the commencement of a turn, for the purpose of warning the drivers of following vehicles of the movements of the automobile, especially at night, and an important object of my invention is to provide a simple and inexpensive switch structure of the character indicated which is practically fool-proof, is rugged and reliable, and of comparatively small size.

Another important object of the invention is to provide a switch structure of the character indicated which can be incorporated in the steering column of automobiles in an out of sight position.

Another important object of the invention is to provide a switch mechanism of the character indicated above which is entirely automatic in its action, and does not depend for its operation or effectiveness upon any manipulations by the driver.

Other objects and advantages of my invention will be apparent from a reading of the following description in connection with the drawings, wherein for purposes of illustration I have shown a preferred embodiment of my invention.

In the drawings:—

Figure 1:
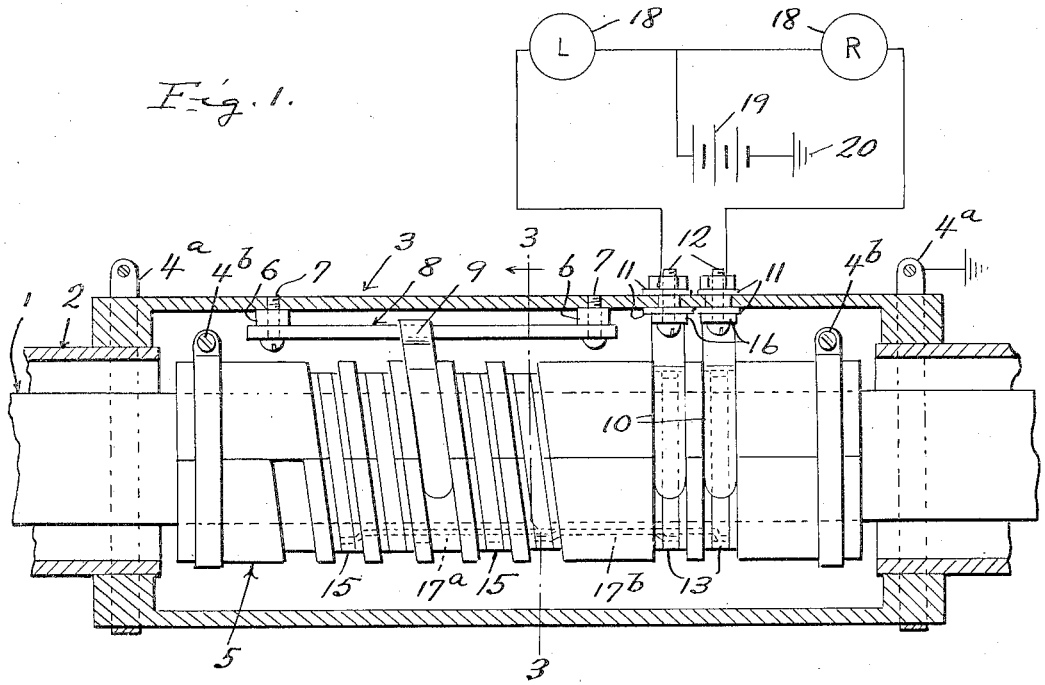
Figure 1 is a longitudinal sectional view through the embodiment showing it applied to the steering column of an automobile, and including a diagrammatic representation of the wiring thereof to a pair of turn signals.
Figure 2:
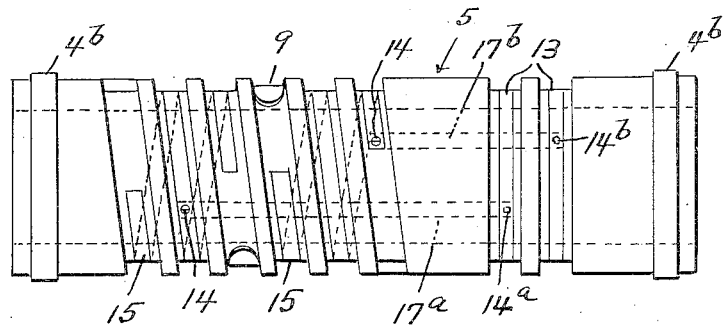
Figure 2 is a bottom plan view of the rotary switch member.
Figure 3:
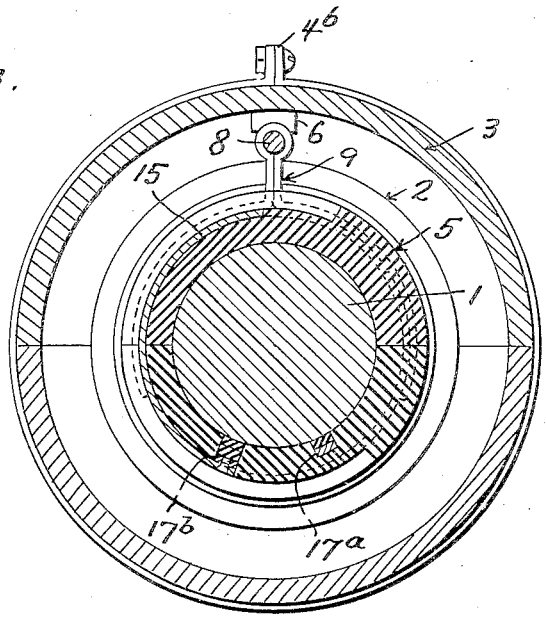
Figure 3 is a transverse vertical sectional view taken through Figure 1 approximately on the line 3—3 and looking toward the left in the direction of the arrows.
Figures 4, 5:
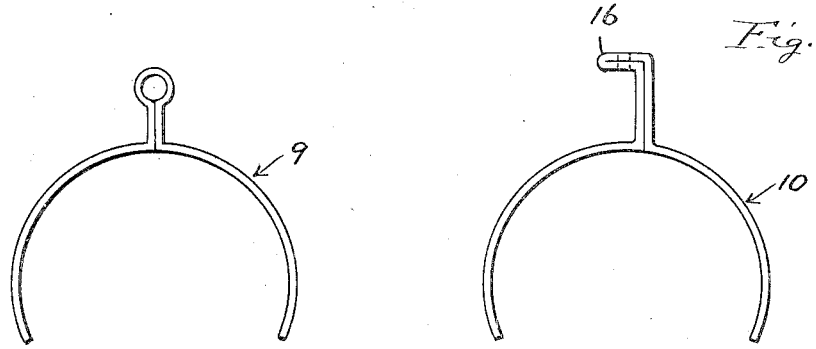
Figure 4 is an end elevational view of the horseshoe-shaped moving brush.
Figure 5 is a view of one of the two stationary horseshoe-shaped brushes.

This invention is an automatic left and right turning signal switch for use on automobiles, to light a light or lights on the rear of an automobile indicating which way the car is about to turn or is turning. At a very slight turn of the steering wheel either way there will flash a light on the rear of the car indicating the turn.

This switch is also useful in warning the car in the rear that you are about to pass the car in front. On a dark night it is useful to the driver of the car in the rear. By observing the turning signal of the car in front the driver in the rear may be warned of a curve in the road and he can keep his car under control.

The switch cover 3 is made of iron and in two parts. Both parts are made alike. On one part is mounted the contact rod 8 and the two stationary brushes 10.

The threaded insulation 5 is made in two parts and should be made of some insulating material such as hard rubber. At one end of the insulation are two grooves. In the middle of each groove is another groove. Toward the other end of the insulation is a section where the insulation is threaded. On both sides of the middle of this section is another set of threads made right in the first set of threads. In one half of the insulation of the inside are two slots for connecting strips 17a, 17b.

The stationary brushes 10 should be made of copper or brass. They are made in horseshoe shape and have a mounting connection on top. They fit in two grooves at one end of the insulator 5 and are fastened to the switch cover by the terminal bolts 12.

Contact rod 8 is a round copper or brass rod. There is a hole at each end so that it can be mounted on the switch cover 3.

Connecting strips 17a, 17b are thin strips of copper or brass. There is a hole in each end of each strip for making connections to the coiled contacts 15 and to the contact rings 13.

Coiled contacts 15 are made of thin copper or brass. They are made in coil shape to fit in the two lower sections of the threaded sections of the insulator 5. These coiled contacts are connected to their respective contact rings 13 by the connecting strips 17a, 17b.

The ring contacts 13 are also made of copper or brass. They are made in ring shape to fit in the lower grooves at the one end of the insulator 5.

The moving brush 9 is made in horseshoe shape and of copper or brass. It has a connection at the top that slides along the contact rod 8 and also in the threaded area of insulator 5.

Clamps 4A are used to hold the sections of the switch cover together. Clamps 4B are used to hold the insulator together and clamping them to the steering rod.

Operation

As the steering rod 1 is turned the threaded insulator 5 which is clamped to the rod also turns. The turning of the insulator causes the moving brush 9 to move in the threaded section of the insulator, also to slide on the contact rod 8. It should be noticed that the middle section of the threaded area has no coiled contacts. When the brush is in this section the switch is open. As the insulator turns the moving brush 9 will move in the threads and come in contact with one of the coiled contacts. This closes the circuit between the battery and the signal light 18. The current in the circuit will travel from the battery 19 to the signal light 18, from the signal light to the terminal 12 connected to the stationary brush 10. The current continues on through the contact ring 13, the connecting strip 17, the coiled contact 15, the moving brush 9, the contact rod 8, the metal cover 3 and on back to the battery 19 through the framework of the car.

The signal that lights depends on which way the steering wheel is turned. The turning of the steering wheel causes the steering rod and the threaded insulator to turn and move the brush in the threads over the coiled contacts.

Mounting

A complete section of the steering rod housing must be cut out. The connecting strips 17 are placed in the insulator 5 and the insulator is clamped to the steering rod 1. The coiled contacts are then placed in the threaded section of the insulator 5 and are screwed to the connecting strips 17a, 17b. The contact rings 13 are also placed in their grooves and screwed to their respective connecting strip 17a, 17b. The two stationary brushes 10 are bolted to the one section of the cover 3. The contact rod 8 with the moving brush 9 on it is screwed to the cover. When the cover of the switch is put on, the wheels of the car should be in a straight position. The one section of the cover 3 is carefully mounted so that the two stationary brushes 10 fit in their respective grooves and the moving brush 9 is in the center or neutral area of the threaded section. The cover 3 should then be clamped together with clamps 4A.

It does not make any particular difference which end of the switch is mounted near the dash. On some cars the switch can be mounted under the hood near the dash and on other cars it will have to be mounted on the steering rod back of the dash. Tests must be made to determine which terminal will be connected to the left signal light and which to the right signal light.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the sub-joined claim.

What is claimed is:—

A rotary electrical switch of the class described comprising a casing, a screw-threaded member rotatably mounted longitudinally in said casing, electrical conducting strips disposed in the bottom of the threads of the said screw member, the inner ends being spaced, said screw member adjacent one end being provided with a pair of circumferentially arranged spaced grooves therein, collector rings in each of said grooves, electrical rings electrically connecting each of said conductors in the circumferentially disposed grooves respectively with one of the conductors in the screw threads of the screw member, a longitudinally disposed rod secured to the inner side of the casing, a U-shaped electrical contact on said rod having the side portions thereof disposed in the screw thread and adapted to electrically contact the conductors in the bottom of the screw threads, and U-shaped electrical contacts secured to the casing and electrically contacting the rings in the circumferentially arranged grooves, said U-shaped contact on said rod being slidable thereon upon rotation of the screw threaded member.

EMERSON A. BOYSON.